Dec. 27, 1927.     1,653,859
L. KÜHN
APPARATUS FOR INFLUENCING ALTERNATING CURRENTS
Filed Nov. 23, 1923

Inventor
Ludwig Kühn.
per H. R. Van Deventer
Attorney.

Patented Dec. 27, 1927.

1,653,859

UNITED STATES PATENT OFFICE.

LUDWIG KÜHN, OF CHARLOTTENBURG, NEAR BERLIN, GERMANY, ASSIGNOR TO THE FIRM: DR. ERICH F. HUTH G. M. B. H., OF BERLIN, GERMANY.

APPARATUS FOR INFLUENCING ALTERNATING CURRENTS.

Application filed November 23, 1923, Serial No. 676,617, and in Germany January 24, 1923.

I have heretofore described a method which makes it possible to modulate an antenna current generated by a tube transmitter by modulating the primary or machine current conducted to the rectifier of the tube transmitter in the rhythm of the tone or speech oscillations by employing alternating current generators of sufficiently high frequency (7 to 10 000 cycles). I have also suggested the employment of choking coils with iron cores to vary the primary current, the alternating current self inductance of which coils is varied by a superimposed tone or speech current. Such self inductance variators with closed iron cores for modulating telephony require certain measures in order to obtain the desired result that the field created by the alternating or high frequency current to be influenced is neutralized in its effect upon the influencing windings which conduct the tone or speech current.

Figure 1:
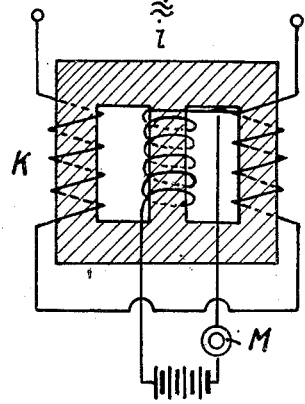
Figure 1 is a diagrammatic view of a simple embodiment of my invention.

As an example Fig. 1 shows a circuit in which the alternating current is influenced by employing a choking coil K with three parts, the two outer parts of which carry the alternating current windings whereas the center part carries the influencing winding inserted in the circuit of microphone M. It is evident that, apart from the fact that harmonics may be more easily suppressed, the alternating current field will not intrude into the influencing windings.

Figure 2:
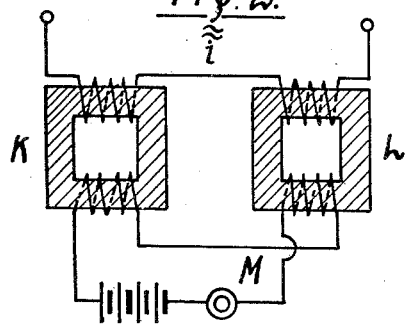
Fig. 2 is a diagrammatic view of a modification of the arrangement in Fig. 1.

Fig. 2 shows another method of construction. In this case two choking coils K, L are employed as self inductance variators. The winding for influencing the coils K, L is wound on both cores arranged in the opposite sense with reference to the alternating current windings, so that harmonics and the effect of the alternating current field is neutralized with respect to the influencing winding.

According to the present practice of experts in the art—as particularly pointed out—the presence of two windings is always characteristic for ferro-magnetic self inductance variators, one of these windings conducting the influencing current, the other the high frequency current to be influenced, a magnetic inductive coupling always being desirable to be effected by special measures.

This invention does not require the complications necessary for such circuits and provides two choking coils which in the same windings carry the influencing current and the current to be influenced.

Figure 3:
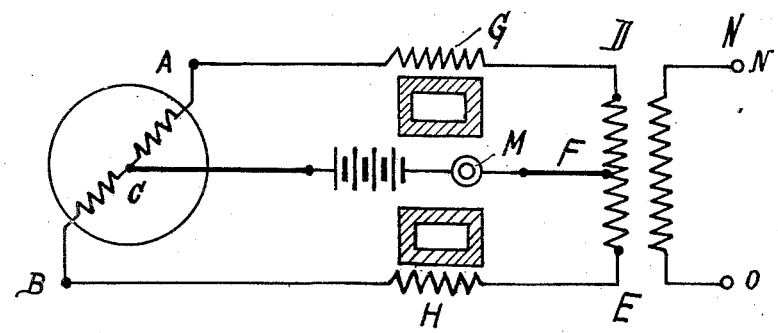
Fig. 3 is a diagrammatic view of a further modification of my invention.

A corresponding circuit is as an example illustrated in Fig. 3. In this figure:

A and B represent the two terminals of the generator windings or high frequency generators.

C indicates the center of the generator windings (in each alternating current generator a lead should be made to this center which is particularly simple with the so called inductive type in which latter the inductor portion always consists of two halves).

D and E represent the terminals of the primary windings of the transformer which transforms the generated energy to the desired tension.

G and H each indicate two self inductance variators.

F designates the center point of the primary winding of the transformer.

N and O show the terminals of the secondary windings of the transformer which are to be connected to the rectifier.

It is evident from the illustration that a potential difference exists between the two centers C and F. If a current however is supplied to the points C and D this current spreads equally over the two choking coils G and H, and by such means it is possible to influence the self inductance and thereby the alternating current of the generator, without having a tension at the connecting points C and F and thereby at the system generating the tone or speech current. As evident from the illustration the primary winding of the transformer does not form a self-inductance for the influencing current connected at C and D, as the effects of fields of the two branch currents are neutralized within the transformer. On the other hand in modern high frequency alternating current generators the self-inductance of the generator windings forms such an exceptionally small reactance for the speech frequency that no noticeable or disturbing reduction of the influencing current at speech frequency is effected by the self-inductance of the two halves of generator windings.

Having now particularly described and ascertained the nature of my said invention and in what manner the same is to be performed, I declare that what I claim is:

1. The combination of a source of alternating current having generating windings, a circuit supplied by said windings, said circuit containing a pair of choke coils one connected to each terminal of said windings, a conductor connected to the midpoint of said windings and to said circuit between said coils, and a source of uni-directional current, and a member responsive to sound waves in the line of said conductor.

2. The combination with a source of alternating current having a winding, a transformer connected thereto having outer terminals and a center tap, an impedance device connected between said transformer and said source, a source of direct current, a modulating device and circuit connections therebetween and to said winding and said center tap.

In testimony whereof I affix my signature.

LUDWIG KÜHN.